United States Patent
Arefeen et al.

(10) Patent No.: US 6,313,602 B1
(45) Date of Patent: Nov. 6, 2001

(54) MODIFIED SPACE VECTOR PULSE WIDTH MODULATION TECHNIQUE TO REDUCE DC BUS RIPPLE EFFECT IN VOLTAGE SOURCE INVERTERS

(75) Inventors: Mohammed Arefeen; Wajiha Shireen, both of Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/543,934

(22) Filed: Apr. 6, 2000

Related U.S. Application Data
(60) Provisional application No. 60/132,053, filed on Apr. 30, 1999.

(51) Int. Cl.$^7$ .................................. H02P 5/34; H02P 7/42
(52) U.S. Cl. ............................................. 318/801; 363/45
(58) Field of Search ..................... 381/723, 799, 381/801, 811; 363/41, 45, 46

(56) References Cited

U.S. PATENT DOCUMENTS

| | | |
|---|---|---|
| 5,053,939 | 10/1991 | Kirchberg, Jr. et al. . |
| 5,111,374 * | 5/1992 | Lai et al. . |
| 5,329,217 | 7/1994 | Kerkman et al. . |
| 5,450,306 * | 9/1995 | Garces et al. . |
| 5,481,451 * | 1/1996 | Kuwahara . |
| 5,483,140 * | 1/1996 | Hess et al. . |
| 5,519,301 | 5/1996 | Makoto et al. . |
| 5,552,977 * | 9/1996 | Xu et al. . |
| 5,621,627 * | 4/1997 | Krawchuk et al. . |
| 5,729,652 * | 3/1998 | Hanson ............................. 363/46 X |
| 5,757,636 * | 5/1998 | Fletcher ............................. 363/98 |
| 6,014,497 * | 1/2000 | Kerkman et al. ............. 318/254 X |
| 6,040,989 * | 3/2000 | Thorn et al. ......................... 363/41 |
| 6,043,624 * | 3/2000 | Masaki et al. ...................... 318/723 |
| 6,185,115 * | 2/2001 | Sul et al. ............................. 363/37 |

FOREIGN PATENT DOCUMENTS

| | | |
|---|---|---|
| 0 252 898 A | 1/1988 | (EP) . |
| 0 293 915 A | 12/1988 | (EP) . |

OTHER PUBLICATIONS

Takahashi, Isao., et al.; *Electrolytic Capacitor–less PWM Inverter*; Nagaoka University of Technology, Nagaoka, Japan, pp. 131–138.

Kim, Joohn Sheok, et al; *New Control Scheme for AC–D-C–AC Converter Without DC Link Electrolytic Capacitor*; Dept. of Electrical Engineering, Seoul National University, Seoul, Korea, pp. 300–306.

Holtz, Joachim, et al; *Direct Frequency Converter With Sinusoidal Line Currents for Speed–Variable ac Motors*; IEEE Transactions on Industrial Electronics, vol. 36, No. 4, Nov., 1989, pp. 475–479.

Ziogas, Phoivos, et al; *Rectifier–Inverter Frequency Changers With Suppressed DC Link Components*; IEEE Transactions on Industry Applications, vol. IA–22, No. 6, Nov./Dec, 1986, pp. 1027–1036.

(List continued on next page.)

Primary Examiner—Jeffrey Donels
(74) Attorney, Agent, or Firm—Robert D. Marshall, Jr.; W. James Brady, III; Frederick J. Telecky, Jr.

(57) ABSTRACT

A modified PWM space vector technique is described which includes a DC ripple voltage measurement scheme supplying feed-back to a DSP controller which then computes and generates the instantaneous PWM drives required for ripple voltage cancellation in a lightly filtered line voltage node, and executes the interface to the multi-phase power inverter circuitry. This preferably becomes a part of a closed loop motor speed control process. Use of the modified PWM drive in this manner greatly reduces the value of the filter capacitor required, allowing for the use of non-electrolytic capacitors having greater reliability and being available at lower cost.

3 Claims, 3 Drawing Sheets

OTHER PUBLICATIONS

Minari, Y., et al; PWM–Rectifier/Voltage–Source Inverter Without DC Link Components for Induction Motor Drive; IEE Proceedings–B, vol. I40, No. 6, Nov., 1993, pp. 363–368.

Larsson, T., et al; Active DC Link Filter for Two Frequency Electric Locomotives, Electric Railways in a United Europe, Mar. 27–30, 1995, Conf. Pub. No. 405, IEE 1995, pp. 97–100.

Malesani, L., et al; AC/DC/AC PWM Converter With Minimum Energy Storage in the DC Link; 1993 IEEE 0–7803–0982–0/93, pp. 306–311.

Chen, C., et al; System Design Issues for Resonant DC Link Inverter Based Drives; 1993 The European Power Electronics Assn., pp. 182–187.

Larsson, T., et al; An Active DC Link Filter for AC–AC Converters; Power Electronics and Variable–Speed Drives, Oct. 26–28, 1994, Conf. Pub. No. 399, IEE, 1994.

* cited by examiner

MODIFIED SPACE VECTOR PULSE WIDTH MODULATION TECHNIQUE TO REDUCE DC BUS RIPPLE EFFECT IN VOLTAGE SOURCE INVERTERS

This application claims priority under 35 USC §119(e)(1) of Provisional Application No. 60/132,053, filed Apr. 30, 1999.

TECHNICAL FIELD OF THE INVENTION

The technical field of this invention is electric motor control.

BACKGROUND OF THE INVENTION

Power converters of the AC-DC-AC type are widely used in motor drives and power supply applications. These AC-DC-AC converters consist of a rectifier-inverter system along with a DC voltage link. The DC link is normally equipped with a large electrolytic capacitor which provides the stiff ripple free DC bus voltage required for proper inverter operation. However, this DC link capacitor is a large, heavy, and expensive component which continues to be a matter of concern in the industrial environment. Moreover, the DC bus capacitor is the prime factor in degradation of system reliability. This has been the driving motivation for much work aimed at decreasing the required size of this DC link capacitor.

A number of techniques have been reported which have been aimed at the complete elimination of the link capacitor, or reduction in its size. The implementation of these methods have required significant changes in the well known, extremely simple, and reliable rectifier-inverter power circuit configuration, and have involved complex control circuitry with added concerns of system stability. Some implementations have even involved the use of expensive floating point digital signal processing elements. In general, these solutions are not applicable to low cost, high volume applications such as fans, blowers and pumps.

Pulse Width Modulation (PWM) techniques have long been used to improve the performance and reliability of power conversion devices. Within the past decade such devices have improved steadily, yet the capacitor size and expense issue, as well as the reliability issue have remained paramount. This invention provides another level of improvement in power conversion devices by unique modifications to the PWM technique.

PWM in its basic form as applied to power inverters is illustrated in FIG. 1, the schematic of a conventional three-phase voltage source inverter. The diode bridge rectifier circuit (components 151, 152, 153, and 154) receives its power input from the AC power source 140, and its output is partially filtered by means of the DC link capacitor 150. The phase A, phase B, and phase C inverter outputs are derived from the inverter configuration comprised of N-channel MOSFET transistors 100 to 102 and 110 to 112. These output signals appear at the three nodes 190, 191 and 192. Providing appropriate drive signals for the gates of transistors 100 to 102 and 110 to 112 is the key to generating proper inverter output voltage. Diodes 160 to 162 and 170 to 172 act to clip any occurrences of reverse voltage at the drain to source of the inverter transistors 100 to 102 and 110 to 112.

The basic PWM equations which relate to the inverter switching functions, essentially the gating signals at the gate of transistors 100 to 102 and 110 to 112 will now be described. Let SW1, SW2, and SW3 be the inverter switching functions. The Fourier series expansions of the switching functions can be written as:

$$\overline{SW} = \begin{bmatrix} SW1 \\ SW2 \\ SW3 \end{bmatrix} = \begin{bmatrix} \sum_{n=1}^{\infty} A_n \sin(n\omega_i t) \\ \sum_{n=1}^{\infty} A_n \sin n(\omega_i t - 120°) \\ \sum_{n=1}^{\infty} A_n \sin n(\omega_i t + 120°) \end{bmatrix} \quad [1]$$

where $\omega_i$ is the inverter operating frequency. The switching function for any PWM scheme consists of the fundamental frequency component, (n=1), and higher order harmonics. For a ripple free dc bus voltage $V_i = V_{DC}$, the inverter line to neutral output voltages are given by:

$$V_n = \begin{bmatrix} V_{an} \\ V_{bn} \\ V_{an} \end{bmatrix} = V_{dc} \times \overline{SW} \quad [2]$$

The line to line voltage at the inverter output is given by:

$$\overline{V_L} = \begin{bmatrix} V_{an} - V_{bn} \\ V_{bn} - V_{cn} \\ V_{cn} - V_{an} \end{bmatrix} = \sqrt{3} \, V_{DC} \begin{bmatrix} \sum_{n=1}^{\infty} A_n \sin n(\omega_i t + \pi/6) \\ \sum_{n=1}^{\infty} A_n \sin n(\omega_i t - \pi/2) \\ \sum_{n=1}^{\infty} A_n \sin n(\omega_i t + 5\pi/6) \end{bmatrix} \quad [3]$$

From equation 3 it is clear that the output voltage contains only the fundamental and the higher order harmonics present in the switching function. However, ripple components in the DC bus voltage of the inverter will have an effect on the AC output voltage.

To understand the effect of the ripple component, consider a case in which the DC bus voltage is not ripple free, as is the case when a smaller capacitor is used in the DC link. Assume that the DC voltage contains sinusoidally varying component of frequency $\omega_r$, and of magnitude $kV_{DC}$. Then the inverter input voltage can be represented as:

$$V_i = V_{DC}(1 + k \sin \omega_r t) \quad [4]$$

The line to neutral inverter output voltage can be computed from equation 2 and is given by:

$$\overline{V_i} = V_{DC}(1 + k \sin \omega_r t) \overline{SW} \quad [5]$$

The inverter line to line voltage can be obtained from equations 3 and 5, and is given by:

$$V_{ab} = \sqrt{3} \, V_{DC} \sum_{n=1}^{\infty} A_n \sin n(\omega_i t + \pi/6) + \quad [6]$$
$$\sqrt{3} \, V_{DC} \sum_{n=1}^{\infty} [A_n(k/2)\sin((\omega_r - n\omega_i)t - n\pi/6)] -$$
$$\sqrt{3} \, V_{DC} \sum_{n=1}^{\infty} [A_n(k/2)\sin((\omega_r - n\omega_i)t + n\pi/6)]$$

From equation 6 it is evident that the DC bus voltage variation has a significant affect on the output voltage, due to the appearance of lower order harmonics ($\omega_i-n\omega_r$) and ($\omega_i-n\omega_r$) not present in the switching function SW.

In order to counteract the DC bus voltage fluctuation, the PWM switching function needs to be altered so that a counter modulation is introduced in the inverter control. The modified switching function for the above described illustration would be:

$$\overline{SW}_{new} = \frac{1}{(1+k\sin\omega_r t)}\overline{SW} \quad [7]$$

Using equation 5, the inverter line to neutral voltage then becomes:

$$\overline{V}_n = V_{DC}(1+k\sin\omega_r t)\overline{SW}_{new} \quad [8]$$

Substituting $\overline{SW}_{new}$ from equation 7 into equation 8, gives:

$$\overline{V}_n = V_{DC} \times \overline{SW} \quad [9]$$

Equation 9 represents the inverter line to line voltage with a ripple component in the DC bus voltage. However, equation 9 is identical to equation 2, in which the DC bus voltage was assumed to be ripple free. Therefore, by employing the proposed technique, i.e. by suitably altering the inverter switching function (SW), immunity to the DC bus voltage ripple component can be achieved. In this invention the conventional space vector PWM technique is modified to meet that goal.

PRIOR ART:

Space Vector Pulse Width Modulation (PWM)

One of the most common methods of PWM is based on the 'space vectors' of the inverter voltages. Space vectors of the line to neutral voltages are shown in FIG. 2. These eight vectors may be understood with reference to the eight inverter states described in Table 1. Each inverter state represents a single combination of the states of inverter switching transistors 100 to 102. Any one, two or all three of these transistors may be 'on' in the eight possible combinations given in Table 1. The state of each of the complementary transistors 110 to 112 is the opposite. For example if transistor 100 is 'on', transistor 110 is 'off', and so on for transistor complementary pairs 101, the complement of 111, and transistor 102, the complement of transistor 112. The eight vectors of FIG. 2 relate to the instantaneous inverter states of Table 1.

TABLE 1

Eight Switching States of Voltage Source Inverter

| State | Transistor 100 | Transistor 101 | Transistor 102 |
|---|---|---|---|
| UPPER INVERTER TRANSISTORS | | | |
| 0 | ON | ON | ON |
| 1 | OFF | ON | ON |
| 2 | ON | OFF | ON |
| 3 | OFF | OFF | ON |
| 4 | ON | ON | OFF |
| 5 | OFF | ON | OFF |
| 6 | ON | OFF | OFF |
| 7 | OFF | OFF | OFF |
| LOWER INVERTER TRANSISTORS | | | |
| 7 | ON | ON | ON |
| 6 | OFF | ON | ON |

TABLE 1-continued

Eight Switching States of Voltage Source Inverter

| State | Transistor 100 | Transistor 101 | Transistor 102 |
|---|---|---|---|
| 5 | ON | OFF | ON |
| 4 | OFF | OFF | ON |
| 3 | ON | ON | OFF |
| 2 | OFF | ON | OFF |
| 1 | ON | OFF | OFF |
| 0 | OFF | OFF | OFF |

Assume an arbitrary voltage v* is to be generated by the three phase voltage source inverter of FIG. 1. The space vector PWM illustration of FIG. 2 shows the space vectors of the line to neutral voltages of such an inverter. The voltage source inverter of FIG. 2 can generate eight total states. Six of these states ($v_1$ through $v_6$) are non-zero vectors. The remaining vectors ($v_0$ and $v_7$) are zero states. They can occur only when all three upper (or lower) inverter switches are 'on'. If only one transistor 100, 101 or 102, or any two transistors 100 and 101, or 101 and 102, or 102 and 103, are allowed to overlap in the 'on' condition, only vectors $v_1$ through $v_6$ can be produced by the inverter and these vectors are termed as base vectors. The case of all three transistors 100, 101, and 102 'off', or all three transistors 100, 101 and 102 'on' corresponds to the case of the null vectors $v_0$ and $v_7$.

The non-zero base vectors divide the cycle into six, 60° wide sectors. The desired voltage v*, located in any given sector can be approximated as a linear combination of the two adjacent base vectors $v_x$ and $v_y$ which are framing that sector, and either one of these two zero vectors as shown in equation 10:

$$v^* d_x v_x + d_y v_y + d_z v_z \quad [10]$$

where: $v_z$ is the zero vector and $d_x$, $d_y$, and $d_z$ denote the duty ratios of states X, Y, and Z within one PWM cycle. The reference voltage v* in FIG. 2 is located within a sector where $v_x = v_4$ and $v_y = v_6$. Therefore, the desired reference voltage can be produced by an appropriate combination of states 4 and 6, or 0 and 7. The state duty ratio is defined as the ratio of the duration to the duration of the switching interval. Therefore:

$$d_x + d_y + d_z = 1 \quad [11]$$

With respect to vector v* in FIG. 1, equation 10 can be written:

$$v^* = MV_{max}e^{j\alpha} = d_x v_4 + d_y v_6 + d_z v_z \quad [12]$$

where: M is the Modulation Index; $V_{max} = (\sqrt{3}/2)V_{DC}$; and $\alpha$ is the instantaneous angle of the motor drive. Taking $V_{DC}$ as the base of the calculation, the following vectors can be written as:

$$v_x = v_4 = 1 + j0 \quad [13]$$

$$v_y = v_6 = (\tfrac{1}{2}) + j(\sqrt{3}/2) \quad [14]$$

$$V_{max} = (\sqrt{3}/2) \quad [15]$$

Substituting from equations 13 through 15 into equation 12:

$$(\sqrt{3}/2) M \cos(\alpha) = d_x + (\tfrac{1}{2})d_y \quad [16]$$

$$(\sqrt{3}/2)\ M\ \cos(\alpha) = (\sqrt{3}/2)\ d_y \quad [17]$$

and solving equations 15 and 16 for $d_x$ and $d_y$:

$$d_x = M\ \sin(60° - \alpha) \quad [18]$$

$$d_y = M\ \sin(\alpha) \quad [19]$$

and equation 11 provides the duration of the $v_z$ vector:

$$d_z = 1 - d_x - d_y \quad [20]$$

The simple algebraic formulas of equation 18 through 20 allow duty ratios of the consecutive logic states of an inverter to be computed in real time.

SUMMARY OF THE INVENTION

The present invention exploits a Modified Space Vector Pulse Width Modulation (PWM) technique which results in improved multi-phase inverter operation in both power supply and motor drive applications and gives this improved performance while allowing for the reduction in the size of the expensive and large size capacitor which is normally required for filtering ripple on the DC bus voltage line.

The above mathematical description of space vector pulse width modulation, given in equations 1 through 20, makes the assumption that the inverter DC bus voltage has a 'stiffness' quality, namely, that is has no fluctuation. This may or may not be true in the real case. This is especially so when a small DC bus capacitor is used, and the DC bus voltage is clearly not ripple-free. The equations for implementing a modified form of space vector PWM include expressions for the modified duty-cycle values which the invention uses to effect a continual update of system duty cycle in order to minimize the effect of DC bus voltage ripple. A system diagram of the present invention shows how the measurement of DC bus voltage ripple can be used to generate a correction, by way of feedback through a controller device to modify instantaneous system duty cycle, thereby acting to reduce ripple effects for a given capacitor size.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
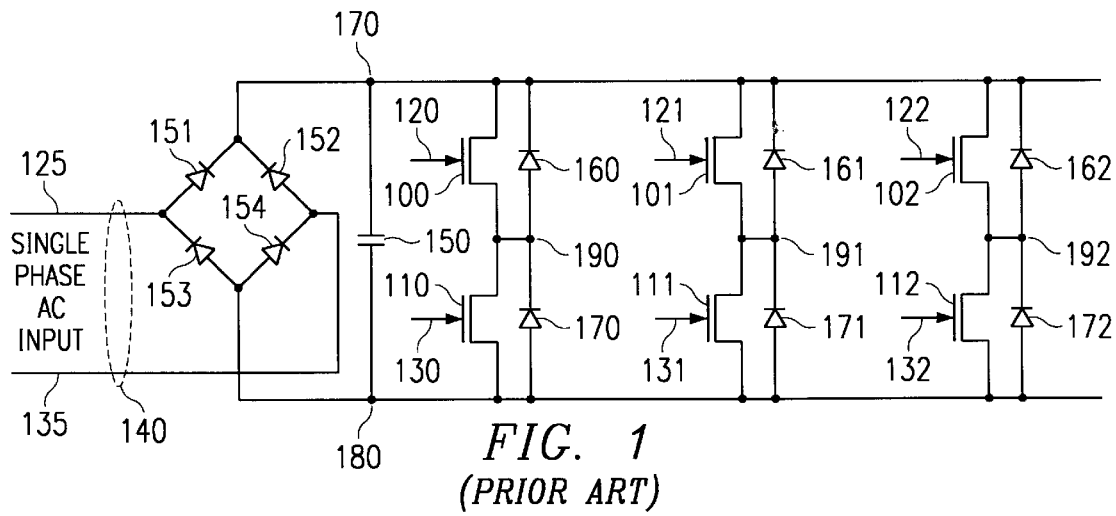
FIG. 1 illustrates a conventional three-phase voltage source inverter circuit configuration according to the prior art.
Figure 2:
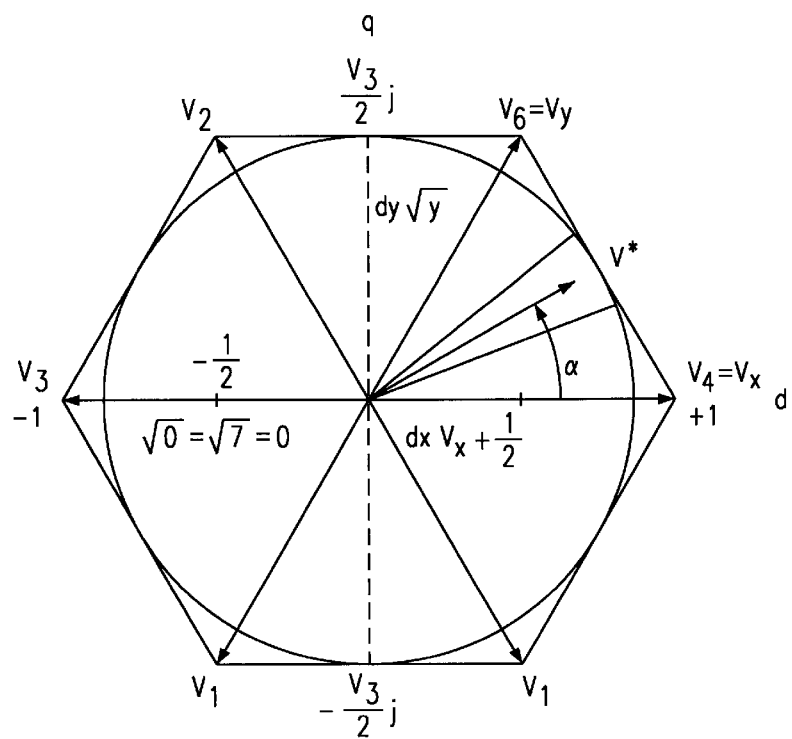
FIG. 2 illustrates the space vectors relating to a three-phase voltage source inverter such as that of FIG. 1 according to the prior art.
Figure 3A:
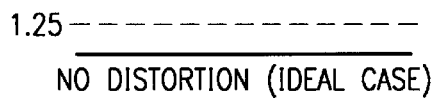
FIG. 3 illustrates the simulated response of the inverter circuit of FIG. 1 for the ideal case of no ripple on DC voltage bus and conventional unmodified PWM inverter drive.
Figure 3B:
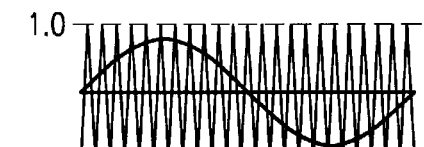
Figure 3C:
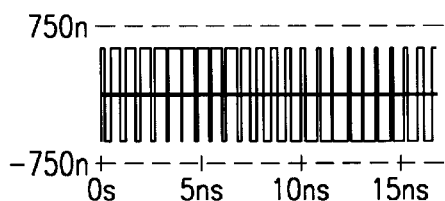
Figure 3D:
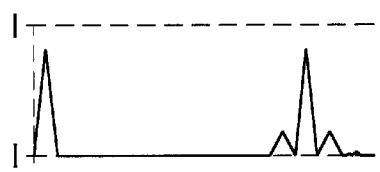
Figure 4A:
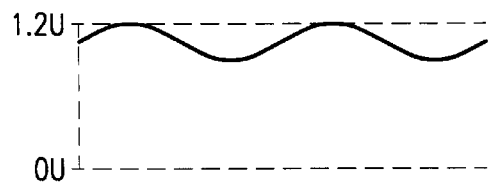
FIG. 4 illustrates the simulated response of the inverter circuit of FIG. 1 for the non-ideal case of 20% ripple on DC voltage bus and conventional unmodified PWM inverter drive.
Figure 4B:
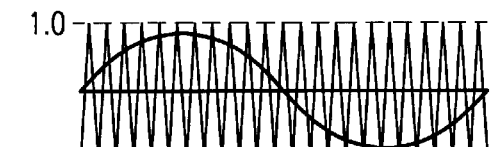
Figure 4C:
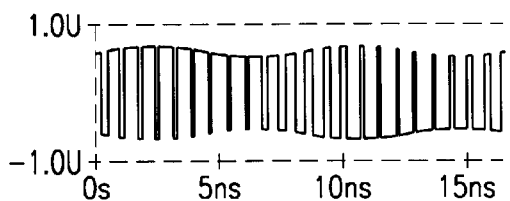
Figure 4D:
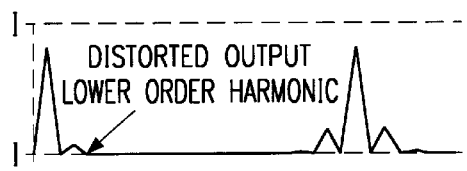
Figure 5A:
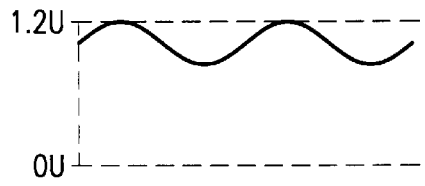
FIG. 5 illustrates the simulated response of the inverter circuit of FIG. 1 for the non-ideal case of 20% ripple on DC voltage bus and PWM inverter drive modified according to the prescription of this invention (equations 24 and 25)
Figure 5B:
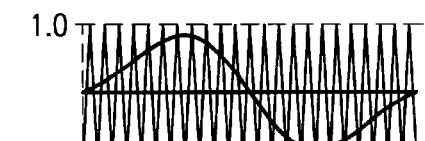
Figure 5C:
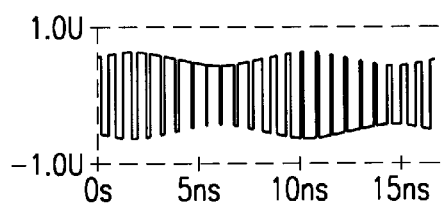
Figure 5D:
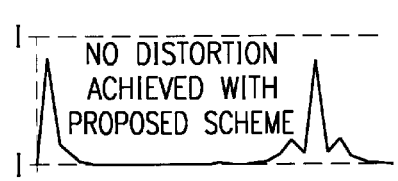

The equations needed for implementing a modified form of space vector PWM are expressions for the modified duty-cycle values which are developed as follows. Because the DC bus voltage ripple does not maintain a steady value it is helpful to assume that the actual DC bus voltage $V_{ripple}$ can be expressed by the equation:

$$V_{DC} = K_{ripple}\ V_{ripple} \quad [21]$$

where: $V_{DC}$ is the desired DC bus voltage; $V_{ripple}$ is the actual DC bus voltage; and $K_{ripple}$ is the ripple factor. $K_{ripple}$ varies with the instantaneous DC bus ripple.

This factor $K_{ripple}$ is utilized to modify the duty ratio of different states. Denoting the duty ratios after DC ripple compensation as $d_{x\_new}$ and $d_{y\_new}$, equations [16] and [17] can be re-written as:

$$(\sqrt{3}/2)\ M\ K_{ripple}\ \cos(\alpha) = d_{x\_new} + (\tfrac{1}{2})\ d_{y\_new} \quad [22]$$

$$(\sqrt{3}/2)\ M\ K_{ripple}\ \cos(\alpha) = (\sqrt{3}/2)\ d_{y\_new} \quad [23]$$

Solving equations [22] and [23] for $d_{x\_new}$ and $d_{y\_new}$, gives:

$$d_{x\_new} = M\ K_{ripple}\ \sin(60° - \alpha) \quad [24]$$

$$d_{y\_new} = M\ K_{ripple}\ \sin(\alpha) \quad [25]$$

It is clear that the new duty ratios are modified by the extent of the DC ripple present in the inverter DC bus. These duty ratios are updated continuously in the system of the present invention to minimize the effect of DC bus voltage ripple.

The effectiveness of the technique of this invention can be shown the results of computer simulations of the inverter circuit (given in FIGS. 3, 4, and 5). In the simulation of FIG. 3, 23 triangular peaks in waveform B represent the sampling rate of the ripple voltage signal, and the sinusoid of waveform B represents the modulating signal. Waveform C presents the frequency spectrum of the inverter line voltage output. Waveform D shows that, in this ideal case, the frequency spectrum contains the fundamental frequency and frequency spectra corresponding to the triangular waveform (twenty-third and higher harmonics of the fundamental sinusoid frequency) but no lower order harmonics corresponding to ripple components on the inverter line voltage.

Contrast the ideal case of FIG. 3 to the case of FIG. 4 where a 20% ripple has been introduced. With the standard unmodified PWM drive signals applied to the inverter gate inputs, the effects of the ripple voltage can be seen in the frequency spectrum graph shown in waveform D of FIG. 4. Components in the fundamental frequency range and lower order harmonics of the fundamental frequency sinusoid are now evident (see distortion noted in the FIG. 4D) and the twenty-third harmonics are still present in the inverter line-to-line voltage output.

FIG. 5 shows a case for which PWM inverter drive inputs, equal to the desired PWM drive inputs, calculated from equations 24 and 25 of this invention, are applied for effective ripple effect cancellation. The frequency spectrum components show only the fundamental frequency range and the twenty-third harmonic range, and no 'distortion' or 'ripple' effects. These have been counteracted by modified PWM and resulting in full ripple-effect cancellation.

The digital signal processor TMS320F240, a low cost fixed point DSP designed for motor control applications provides a means for applying the modified PWM technique of this invention. This is accomplished by driving the inverter input gates 120, 121, 122, 130, 131 and 132, of respective transistors 100, 101, 102, 110, 111, and 112 of FIG. 1 with suitable signals from the DSP generated at its 'event timer outputs'.

Figure 6:
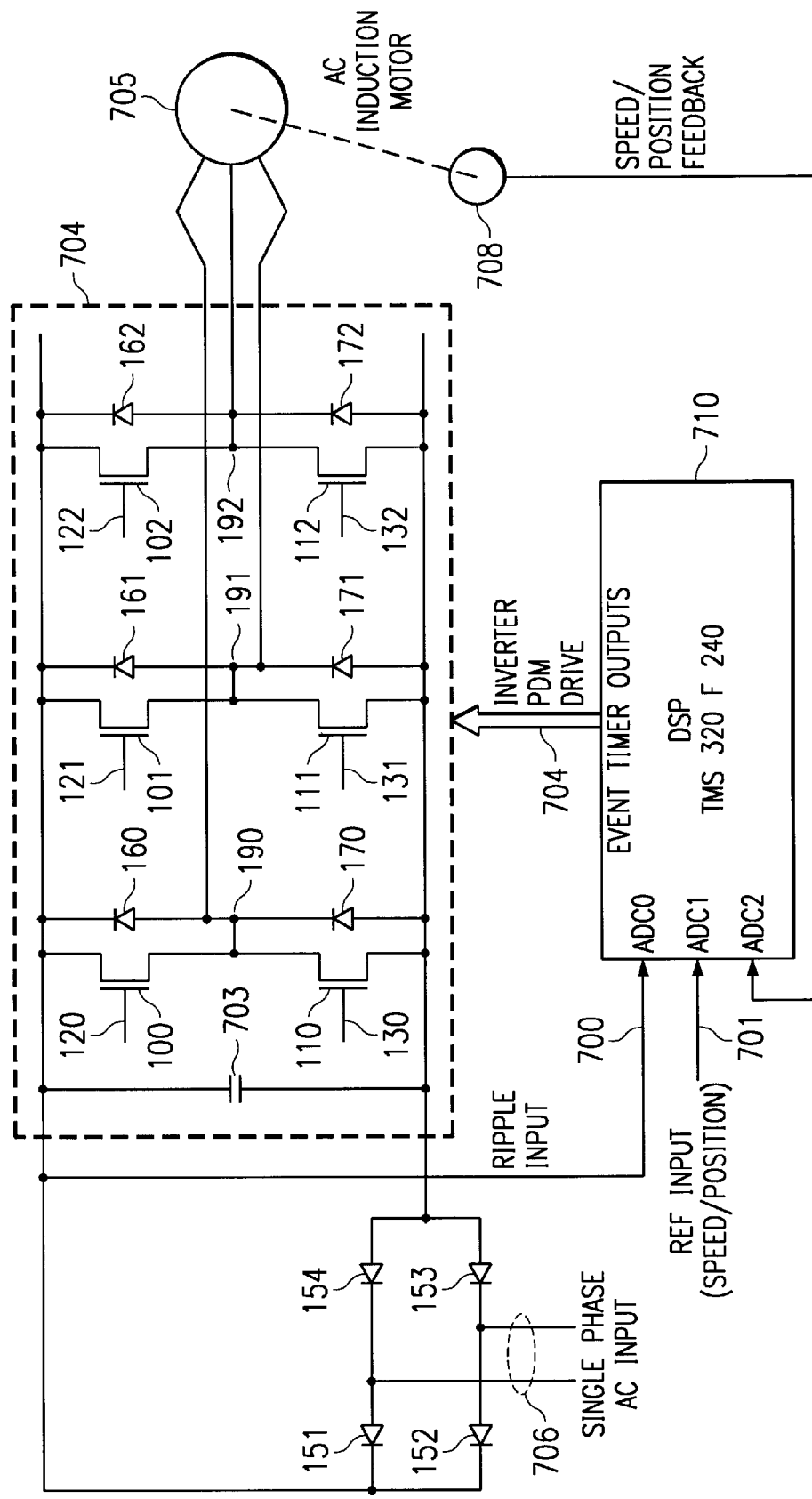
FIG. 6 illustrates the block diagram of the system of this invention, a modified space vector PWM technique for use in multi-phase voltage source inverters for use in motor drive or power supply applications.

FIG. 6 illustrates an embodiment of this invention, a three-phase AC induction motor 705 being driven by the modified PWM approach. Parts illustrated in FIG. 1 are given identical reference numbers in FIG. 6. This invention is preferably implemented on a Texas Instruments TMS320F240 DSP 710. This DSP 710 includes eight-channel analog-to-digital conversion inputs and plural event counter/timers. The DSP 710 receives the analog signal from the line voltage output 700 which instantaneously contains the ripple component. This signal 700 contains the undesired ripple voltage component has been filtered by a relatively small, low cost capacitor 703. Capacitor 703 preferably has a higher reliability than electrolytic capacitors used in filtering with large capacitors. This signal is applied to a first analog-to-digital conversion input ADC0. A reference voltage 701, used to input the control speed, is supplied to a second analog-to-digital conversion input ADC1. A third analog-to-digital conversion input ADC3 receives an instantaneous speed/position feedback signal 702 from speed/position feedback sensor 708. The digital signal processor 710 internally calculates the instantaneous duty ratios required according to equations 24 and 25 from an analog-to-digital conversion of the input ripple signal and supplies the required inverter PWM drive at the 'event manager' outputs 704. The connections are not illustrated in FIG. 6 for the sake of clarity. These 'event manager' outputs are applied to the gates of N-channel MOSFET transistors 100 to 102 and 110 to 112 to control the three-phase drive to motor 705 as previously described. These inverter inputs thus driven become part of a 'closed loop' from the speed/position feedback signal 702, which acts to cancel out the effects of the ripple component of the line voltage. Note that closed loop feedback control of motor speed to follow a speed reference voltage is conventional and well understood in the art and need not be further described here. This results in effective distortion free line voltage without the need for using high value electrolytic capacitors in the link filtering circuit. This low cost DSP 710 and unmodified voltage source inverter solution to the filtering problem stands in contrast to other proposed versions of modified inverter drive, where floating point processors are required or significant complexity has been added to the conventional straightforward voltage source inverter circuit of FIG. 1.

What is claimed is:

1. A method for space vector pulse width modulation drive of a motor from a rectified AC input voltage comprising the steps of:

measuring a voltage ripple of the rectified AC input voltage;

calculating corrected instantaneous pulse width modulation drive based upon the corresponding measured voltage ripple, said step of calculating corrected instantaneous pulse width modulation drive calculates respective X, Y, and Z duty cycle ratios $d_x$, $d_y$, and $d_z$ as follows:

$d_x = M\ K_{ripple}\ \sin(60° - \alpha)$ $d_y = M\ K_{ripple}\ \sin(\alpha)$ $d_z = 1 - d_x - d_y$ where: M is a modulation index; $K_{ripple}$ is the ripple factor of the instantaneous DC bus ripple; and a is the instantaneous angle of the motor drive;

supplying said corrected pulse width modulation drive to a three-phase driver to form pulse width modulation motor drive; and supplying said pulse width modulation motor drive to a three-phase motor.

2. An apparatus for motor drive control comprising:

a full wave bridge rectifier having a pair AC input terminals adapted for connection to an AC voltage source and first and second DC output terminals;

a capacitor connected across said first and second DC output terminals of said full wave bridge rectifier;

a three-phase voltage source inverter having a pair of input terminals connected to said first and second DC output terminals of said full wave bridge rectifier and first, second and third phase output terminals for supplying three-phase power, a first transistor having a source-drain path connected between said first DC output terminal and said first phase output terminal, a second transistor having a source-drain path connected between said first DC output terminal and said second phase output terminal, a third transistor having a source-drain path connected between said first DC output terminal and said third phase output terminal, a fourth transistor having a source-drain path connected between said second DC output terminal and said first phase output terminal, a fifth transistor having a source-drain path connected between said second DC output terminal and said second phase output terminal, a fifth transistor having a source-drain path connected between said second DC output terminal and said third phase output terminal;

a three-phase motor connected to said first, second and third phase output terminals of said three-phase voltage source inverter; and a digital signal processor having an analog-to-digital input receiving a signal corresponding to a ripple voltage at said capacitor and event signal outputs connected to respective gates of said first, second, third, fourth, fifth and sixth transistors, said digital signal processor programmed to calculate respective X, Y, and Z duty cycle ratios $d_x$, $d_y$, and $d_z$ as follows:

$d_x = M\ K_{ripple}\ \sin(60° - \alpha)$ $d_y = M\ K_{ripple}\ \sin(\alpha)$ $d_z = 1 - d_x - d_y$ where: M is a modulation index; $K_{ripple}$ is the ripple factor of the instantaneous ripple voltage; and a is the instantaneous angle of the motor drive thereby calculating corrected instantaneous pulse width modulation drive signals based upon an instantaneous value of said ripple voltage at said analog-to-digital input and to supply event signal outputs to respective gates of said first, second, third, fourth, fifth and sixth transistors for corrected pulse width modulation drive.

3. An apparatus for motor drive control comprising:

a full wave bridge rectifier having a pair AC input terminals adapted for connection to an AC voltage source and first and second DC output terminals;

a capacitor connected across said first and second DC output terminals of said full wave bridge rectifier;

a three-phase voltage source inverter having a pair of input terminals connected to said first and second DC output terminals of said full wave bridge rectifier and first, second and third phase output terminals for supplying three-phase power, a first transistor having a source-drain path connected between said first DC output terminal and said first phase output terminal, a second transistor having a source-drain path connected between said first DC output terminal and said second phase output terminal, a third transistor having a source-drain path connected between said first DC output terminal and said third phase output terminal, a fourth transistor having a source-drain path connected between said second DC output terminal and said first phase output terminal, a fifth transistor having a source-drain path connected between said second DC output terminal and said second phase output terminal, a fifth transistor having a source-drain path connected between said second DC output terminal and said third phase output terminal;

a three-phase motor connected to said first, second and third phase output terminals of said three-phase voltage source inverter;

a digital signal processor having an analog-to-digital input receiving a signal corresponding to a ripple voltage at said capacitor and event signal outputs connected to respective gates of said first, second, third, fourth, fifth and sixth transistors, said digital signal processor programmed to calculate corrected instantaneous pulse width modulation drive signals based upon an instantaneous value of said ripple voltage at said analog-to-digital input and to supply event signal outputs to respective gates of said first, second, third, fourth, fifth and sixth transistors for corrected pulse width modulation drive;

a speed sensor connected to said three-phase motor for generating an instantaneous speed signal corresponding to an instantaneous speed of said three-phase motor; and said digital signal processor further having a second analog-to-digital input receiving a speed reference signal, said digital signal processor further programmed to calculate said corrected pulse width modulation drive signals to control said instantaneous speed signal to track said speed reference signal.

* * * * *